United States Patent [19]
Takahashi et al.

[11] Patent Number: 5,669,804
[45] Date of Patent: Sep. 23, 1997

[54] MAGNETIC TAPE SURFACE TREATMENT METHOD AND APPARATUS

[75] Inventors: Kazuo Takahashi; Mitsuhiro Ono; Takumi Honma, all of Miyagi, Japan

[73] Assignee: Sony Corporation, Tokyo, Japan

[21] Appl. No.: 546,955

[22] Filed: Oct. 23, 1995

[30] Foreign Application Priority Data

Oct. 25, 1994 [JP] Japan ................ 6-260120

[51] Int. Cl.$^6$ .................................. B24B 1/00
[52] U.S. Cl. .................. 451/59; 451/9; 451/10; 451/309; 451/168; 451/169
[58] Field of Search ............... 451/59, 296, 299, 451/309, 303, 168, 169, 24, 10, 11, 9

[56] References Cited

U.S. PATENT DOCUMENTS

| | | | |
|---|---|---|---|
| 3,193,410 | 7/1965 | Forrest et al. | 451/299 |
| 4,254,585 | 3/1981 | Schoettle et al. | |
| 4,858,265 | 8/1989 | Suzuki et al. | 451/296 |
| 5,203,119 | 4/1993 | Cole | 451/24 |
| 5,237,779 | 8/1993 | Ota | 451/10 |
| 5,431,592 | 7/1995 | Nakata | 451/303 |

FOREIGN PATENT DOCUMENTS

| | | | |
|---|---|---|---|
| 325801 | 8/1989 | European Pat. Off. | |
| 598205 | 5/1994 | European Pat. Off. | |
| 361146465A | 7/1986 | Japan | 451/299 |
| 363089264 | 4/1988 | Japan | 451/303 |

*Primary Examiner*—Robert A. Rose
*Assistant Examiner*—George Nguyen
*Attorney, Agent, or Firm*—Jay H. Maioli

[57] ABSTRACT

In a magnetic tape surface treatment method and apparatus for rubbing together a magnetic tape and a lapping tape and thereby removing projections and adhered matter from the magnetic surface to the magnetic tape pressurized air is blown onto the tapes to prevent the formation of an air film between the contacting surfaces of the two tapes. This enhances the contact quality and improves the surface treatment efficiency.

Also uniformity of the surface treatment effect is enhanced by simultaneously controlling the tensions in the magnetic tape before and after the two tapes make contact.

18 Claims, 9 Drawing Sheets

MAGNETIC TAPE SURFACE TREATMENT METHOD AND APPARATUS

BACKGROUND OF THE INVENTION

This invention relates to a magnetic tape surface treatment apparatus for removing projections and adhered matter from a magnetic surface of a magnetic tape in a magnetic tape manufacturing process and thereby reducing dropout, and particularly to a magnetic tape surface treatment apparatus with which both improvement of the surface treatment effect and reduction of dropouts are simultaneously made possible.

In magnetic tape manufacturing, minute projections and adhered matter often arise on the magnetic surface of the magnetic tape being manufactured. These constitute a cause of so-called dropout during magnetic recording and playback. Because of this, in a magnetic tape manufacturing process, a magnetic tape surface treatment apparatus for removing the above-mentioned projections and adhered matter from the surface of the magnetic tape is used.

The principle of a magnetic tape surface treatment apparatus is to rub the magnetic surface of the magnetic tape with a lapping tape and thereby remove projections and adhered matter from the magnetic surface by friction arising between the two tapes. FIG. 1 shows an example of a construction of a conventional magnetic tape surface treatment apparatus.

In FIG. 1, a magnetic tape 1 which is the object of the surface treatment is first fed from a let-out side into infeed rollers 2. The infeed rollers 2 are two rollers rotating in mutually opposite directions in contact with each other and are driven by a motor 3. The magnetic tape 1 passes between the two infeed rollers 2 and is fed to a guide roller 4.

The guide roller 4 changes the travel direction of the magnetic tape 1, with the magnetic surface thereof facing outward as it passes around the guide roller 4. The magnetic tape 1 having had its travel direction changed by the guide roller 4 passes through an angle θ sector distance around a guide roller 5 for lapping with its magnetic surface facing inward and then leaves the guide roller 5 for lapping and is fed to a guide roller 6.

The guide roller 6 changes the travel direction of the magnetic tape 1 again, with the magnetic surface thereof facing outward as it passes around the guide roller 6. As a result of passing around the guide roller 6 the magnetic tape 1 has its travel direction changed to the same direction as when it was let in and then is fed to outfeed rollers 7.

The outfeed rollers 7 are two rollers rotating in mutually opposite directions in contact with each other and are driven by a motor 8. The magnetic tape 1 passes between these two rollers and is fed out to a take-up side.

As shown in FIG. 2, a lapping tape 9 is interposed between the surface of the guide roller 5 for lapping and the magnetic surface of the magnetic tape 1. The lapping tape 9 has its ends connected to lapping tape rollers 10, 11 rotating in mutually opposite directions and is transported in the opposite direction to the magnetic tape 1 by the roller 10 being rotationally driven by a motor 12 (see FIG. 1).

Consequently, a friction occurs between the magnetic surface of the magnetic tape 1 and the surface of the lapping tape 9, and as a result projections and adhered matter on the magnetic surface of the magnetic tape 1 are removed by the lapping tape 9.

Because the magnetic tape 1 fed in by the infeed rollers 2 and pulled out by the outfeed rollers 7 has its speed reduced by friction between itself and the lapping tape 9 at the guide roller 5 for lapping, as shown in FIG. 3 and FIG. 4, the tension (called the entrance tension) of the magnetic tape 1 at a position (called the entrance) before it makes contact with the lapping tape 9 is relatively small, whereas the tension (called the exit tension) at a position (called the exit) after it has made contact with the lapping tape 9 is larger than the entrance tension.

In a magnetic tape surface treatment apparatus, it is important that the entrance tension and the exit tension of the magnetic tape 1 be kept constant in order to make the effect of the surface treatment uniform. To achieve this, as shown in FIG. 1, the magnetic tape surface treatment apparatus is provided with an entrance tension detector 13 for detecting the entrance tension, an exit tension detector 14 for detecting the exit tension, and a control circuit 50 for controlling the motors 3, 8 and 12 based on the entrance tension and the exit tension detected by these tension detectors.

The control circuit 50 has a speed setter 51 for setting the entrance speed of the magnetic tape 1, that is, the speed of rotation of the infeed rollers 2, to a constant value; an entrance tension setter 52 for setting the entrance tension; an exit tension setter 53 for setting the exit tension and a lapping feed speed setter 54 for setting the feed speed of the lapping tape 9.

A speed signal A showing the speed set by the speed setter 51 is fed through a PID 55 which carries out proportional+integral+differential control operations and an INV 56 which is an invertor to the motor 3 and controls the rotational speed of the motor. This speed signal A is also one of the inputs of an adder 57 which will be further discussed later.

The difference between an entrance tension set value set by the entrance tension setter 52 and an entrance tension detected value detected by the entrance tension detector 13 is obtained by a subtracter 58. The obtained difference signal becomes one of the inputs of a switching circuit 59.

The difference between an exit tension set value set by the entrance tension setter 53 and an exit tension detected value detected by the entrance tension detector 14 is obtained by a subtracter 60, and the obtained difference signal becomes the other input of the switching circuit 59.

The switching circuit 59 switches between and outputs the input from the subtracter 58 and the input from the subtracter 60. The output of the switching circuit 59 becomes the other input of the adder 57.

The adder 57 adds the input from the switching circuit 59 to the output signal A of the speed setter 51 and feeds the addition result to the motor 8 through a PID 61 and an INV 62. The rotational speed of the outfeed rollers 7 is thereby controlled.

The feed speed of the lapping tape 9 set by the lapping feed speed setter 54 is fed to the motor 12 through an SPC 63 which carries out speed control and the rotational speed of the roller 10 is thereby controlled.

In magnetic tape manufacture, importance is attached to manufacturing speed and product quality.

Because the magnetic tape surface treatment apparatus is a part of a magnetic tape production line, to increase the magnetic tape production speed it is necessary to raise the magnetic tape surface treatment speed.

However, in a conventional magnetic tape surface treatment apparatus, because when the treatment speed is raised the surface treatment effect falls, it has not been possible to increase very much the surface treatment speed of magnetic tape of which high quality is required and consequently there has been the problem that the magnetic tape surface treatment apparatus limits the magnetic tape production speed.

The reason why it is not possible to raise the surface treatment speed very much is that an air film forms between the magnetic tape and the lapping tape and there is a tendency for the magnetic tape to float up, and when the surface treatment speed, in other words the travel speed of the magnetic tape, is raised, the amount by which the magnetic tape floats up from the lapping tape increases and as a result the quality of the contact between the two tapes falls and the surface treatment effect falls.

Conventionally, positive measures to eliminate the air film have not been considered, and consequently a magnetic tape surface treatment apparatus having air film removal means has not existed.

For that reason, in manufacturing magnetic tape of which high quality is required, steps such as reducing the speed of the magnetic tape surface treatment apparatus and carrying out surface treatment a plurality of times or setting up a dedicated process for surface treatment have been taken. Consequently, there has been the problem that material costs, labor and lead times to product completion all increase.

Also, with regard to quality stability, conventionally, because only either entrance tension control or exit tension control has been carried out at one time, when entrance tension control is being carried out the exit tension is kept constant but the exit tension becomes unstable, as shown in FIG. 3, and when entrance tension control is being carried out the exit tension is kept constant but the entrance tension becomes unstable, as shown in FIG. 4. This has been a cause of increased dropout of the magnetic tape.

SUMMARY OF THE INVENTION

Accordingly, an object of this invention is to provide a magnetic tape surface treatment apparatus which makes it possible to produce a magnetic tape of high dropout quality at a high speed, and to achieve this object the invention provides means for removing the air film obstacle so that the quality of contact between a magnetic tape and a lapping tape during high speed travel can be greatly increased compared to conventionally and controlling means for continuously keeping this high contact quality constant.

Specifically, the invention provides a magnetic tape surface treatment method for transporting a magnetic tape and a lapping tape while causing them to make contact and thereby removing projections and adhered matter from a magnetic surface of the magnetic tape wherein air is blown onto the tapes at an initial position where the magnetic tape and the lapping tape are intended to make contact.

According to another aspect of the invention the air blowing force and the travel speed of the magnetic tape are regulatable with respect to each other; the air blowing force and the tension of the magnetic tape on the entrance side on which the magnetic tape is let out and the tension of the magnetic tape on the exit side on which the magnetic tape is taken up are regulatable with respect to each other; the travel speed of the lapping tape is changed in correspondence with the travel speed of the magnetic tape; and the air blowing is carried out from the magnetic tape side.

The invention also provides a magnetic tape surface treatment apparatus for rubbing a magnetic tape with a lapping tape and removing projections and adhered matter from a magnetic surface of the magnetic tape comprising regulating means for regulating the tension of the magnetic tape and pressurized air means for blowing air onto the tapes at an initial position where the magnetic tape and the lapping tape are intended to make contact.

According to other aspects of the invention the regulating means is provided with controlling means for simultaneously feedback controlling, the tension of the magnetic tape on the entrance side on which the magnetic tape is let out and the tension of the magnetic tape on the exit side on which the magnetic tape is taken up; the controlling means makes the speed of the magnetic tape on the entrance side on which the magnetic tape is let out a reference and controls the speed of the magnetic tape on the exit side on which the magnetic tape is taken up and thereby feedback controls the exit side tension and controls the pressurized air means and thereby feedback controls the entrance side tension; the controlling means makes the entrance side tape speed a reference and controls the exit side tape speed and thereby feedback controls the entrance side tension and controls the pressurized air means and thereby feedback controls the exit side tension; the entrance side tape speed is kept constant; the controlling means makes the speed of the magnetic tape on the exit side on which the magnetic tape is taken up a reference and controls the speed of the magnetic tape on the entrance side on which the magnetic tape is let out and thereby feedback controls the entrance side tension and controls the pressurized air means and thereby feedback controls the exit side tension; the controlling means makes the exit side tape speed a reference and controls the entrance side tape speed and thereby feedback controls the exit side tension and controls the pressurized air means and thereby feedback controls the entrance side tension; the exit side tape speed is kept constant; the controlling means makes the entrance side tension or the exit side tension a reference and controls the speed of the lapping tape and/or the force of the air of the pressurized air means and thereby feedback controls the entrance side tension and the exit side tension; the controlling means controls the exit side tape speed based on the entrance side tension and controls the entrance side tape speed based on the exit side tension and thereby feedback controls the entrance side tension and the exit side tension; the controlling means makes the force of the air of the pressurized air means a reference and controls the entrance side tape speed and thereby feedback controls the entrance side tension and controls the exit side tape speed and thereby feedback controls the exit side tension; the controlling means makes the force of the air of the pressurized air means a reference and controls the exit side tape speed and thereby feedback controls the exit side tension and controls the entrance side tape speed and thereby feedback controls the entrance side tension; the controlling means makes the force of the air of the pressurized air means a reference and controls the speed of the lapping tape and thereby feedback controls the entrance side tension and the exit side tension; the controlling means makes the speed of the lapping tape a reference and controls the entrance side tape speed and thereby feedback controls the entrance side tension and controls the exit side tape speed and thereby feedback controls the exit side tension; the controlling means makes the speed of the lapping tape a reference and controls the exit side tape speed and thereby feedback controls the exit side tension and controls the entrance side tape speed and thereby feedback controls the entrance side tension; and the controlling means makes the speed of the lapping tape a reference and feedback controls the entrance side tension and the exit side tension.

The magnetic tape surface treatment method and apparatus having the construction described above operate in the following way:

(1) By air being blown from the pressurized air means onto the magnetic tape from the outer side thereof, formation of an air film between the magnetic tape and the lapping tape is inhibited, and the contact quality between the two tapes is increased and the friction between the two tapes increases. Consequently the surface treatment efficiency with which projections and adhered matter on the magnetic surface are removed by the friction between the two tapes improves and as a result the magnetic tape productivity also rises.

(2) By the entrance tension and the exit tension of the magnetic tape being simultaneously controlled and constantly optimized, dispersion in dropout quality can be eliminated.

For this, various control methods are conceivable, and there are for example: (a) keeping the entrance speed of the magnetic tape constant and with this as a reference feedback controlling the exit tension by way of the exit speed and controlling the pressurized air means and thereby feedback controlling the entrance tension, (b) feedback controlling the entrance tension by way of the exit speed with the entrance speed as a reference and feedback controlling the exit tension by way of the pressurized air means, (c) keeping the exit speed of the magnetic tape constant and with this as a reference controlling the entrance tension, the exit tension, and pressurized air from the pressurized air means.

Also, with respect to any of (a), (b) and (c) of (2) above, it is possible to deal with reduction in the frictional force due to clogging of the lapping tape by controlling the speed of the lapping tape or the force of the air of the pressurized air means and thereby feedback controlling the entrance tension or the exit tension.

DETAILED DESCRIPTION OF THE PREFERRED EMBODIMENTS

Figure 1:
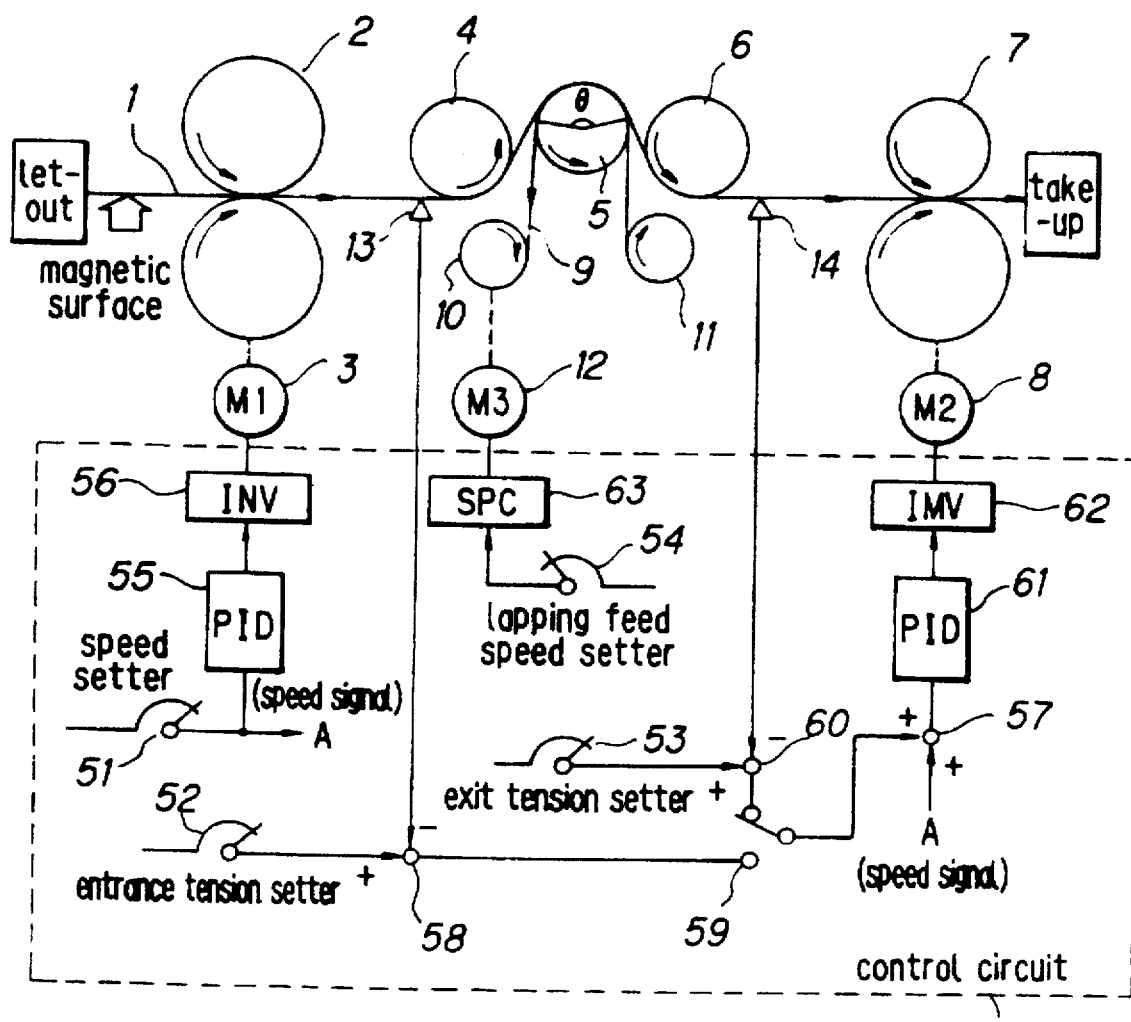
FIG. 1 is a block diagram showing the construction of a conventional magnetic tape surface treatment apparatus.
Figure 2:
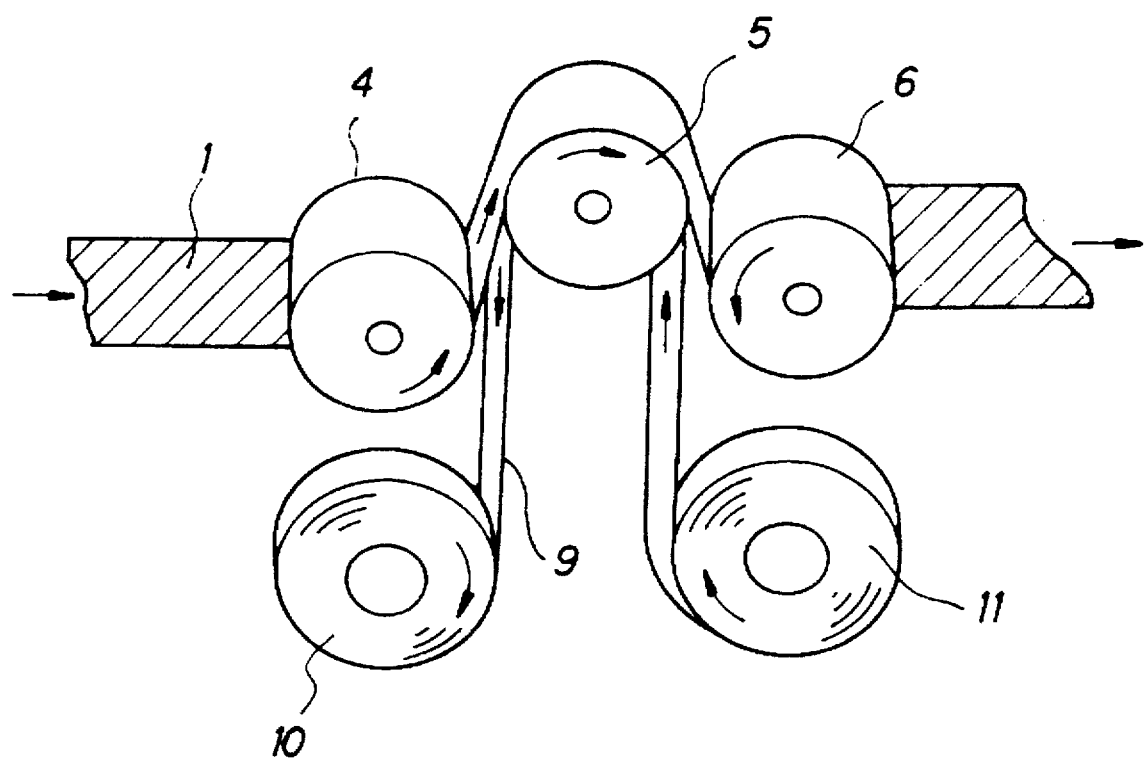
FIG. 2 is a view illustrating the vicinity of a lapping tape 9.
Figure 3:
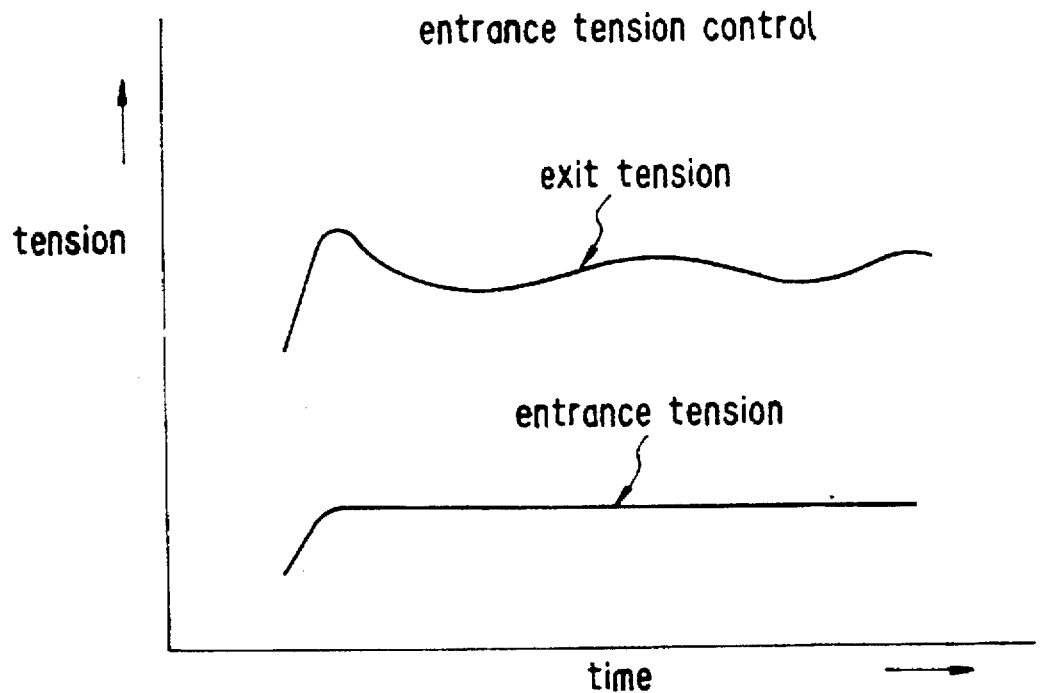
FIG. 3 is a view illustrating variation in tension of a magnetic tape in a conventional magnetic tape surface treatment.
Figure 4:
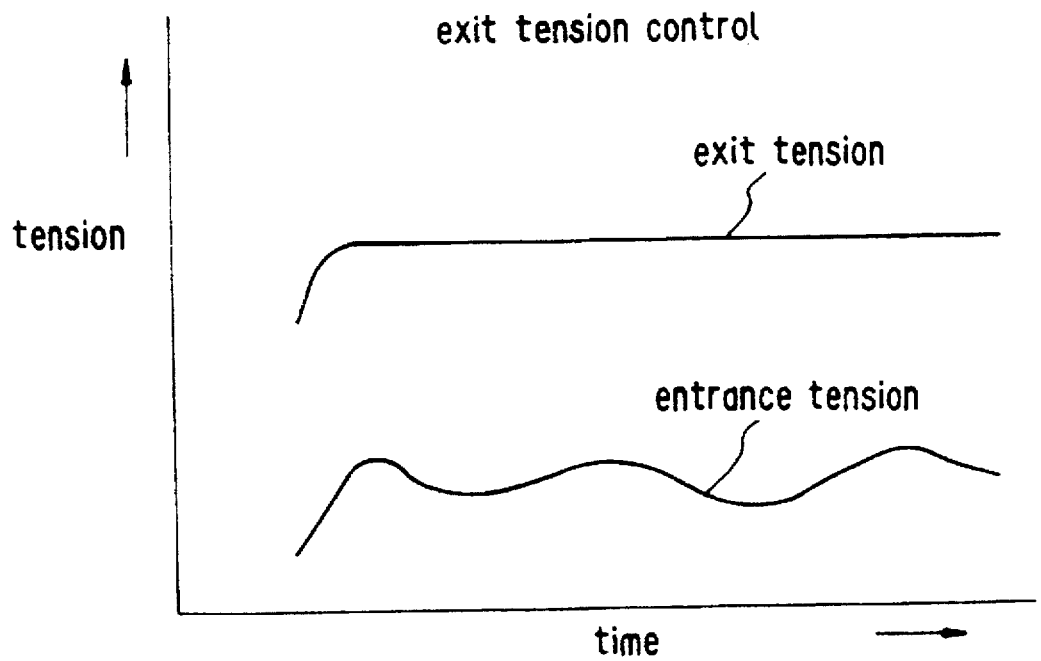
FIG. 4 is a view illustrating variation in tension of a magnetic tape in a conventional magnetic tape surface treatment.
Figure 5:
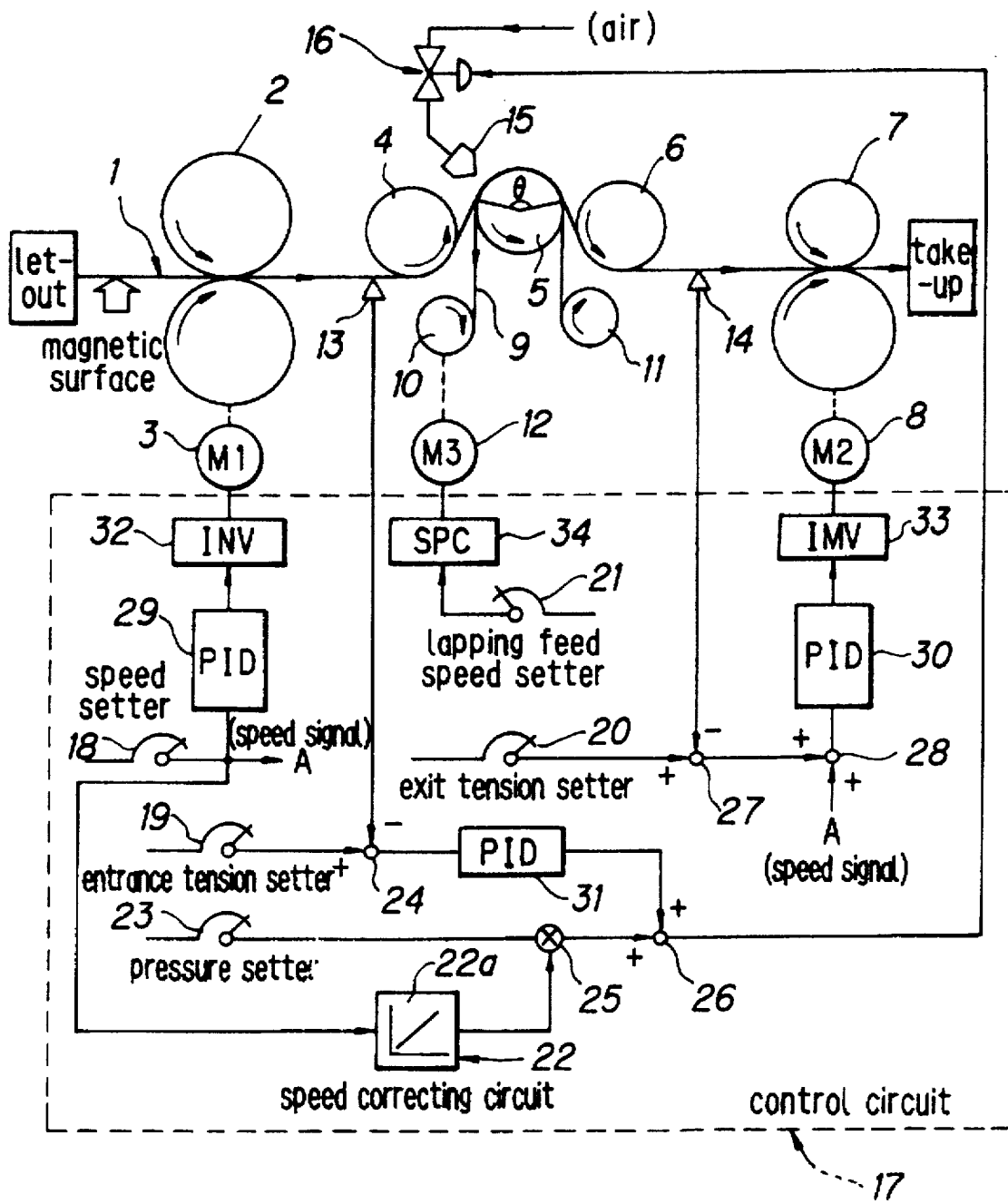
FIG. 5 is a block diagram showing the construction of a first preferred embodiment of a magnetic tape surface treatment apparatus according to the invention.

A first preferred embodiment of a magnetic tape surface treatment method and apparatus according to the invention will now be described with reference to FIG. 5. In FIG. 5, parts having the same reference numerals as in FIG. 1 are the same parts and detailed descriptions thereof will be omitted.

This preferred embodiment is a magnetic tape surface treatment apparatus applied to a magnetic tapes cut by a slitter in a magnetic tape manufacturing process, and comprises a magnetic tape 1, infeed rollers 2, guide rollers 4, 5, 6, outfeed rollers 7, a lapping tape 9, lapping tape rollers 10, 11, motors 3, 8, 12, an entrance tension detector 13 and an exit tension detector 14. There are also provided an air nozzle 15 and an air pressure regulating valve 16 constituting pressurized air means and a control circuit 17, which are characteristic features of the invention.

Figure 6:
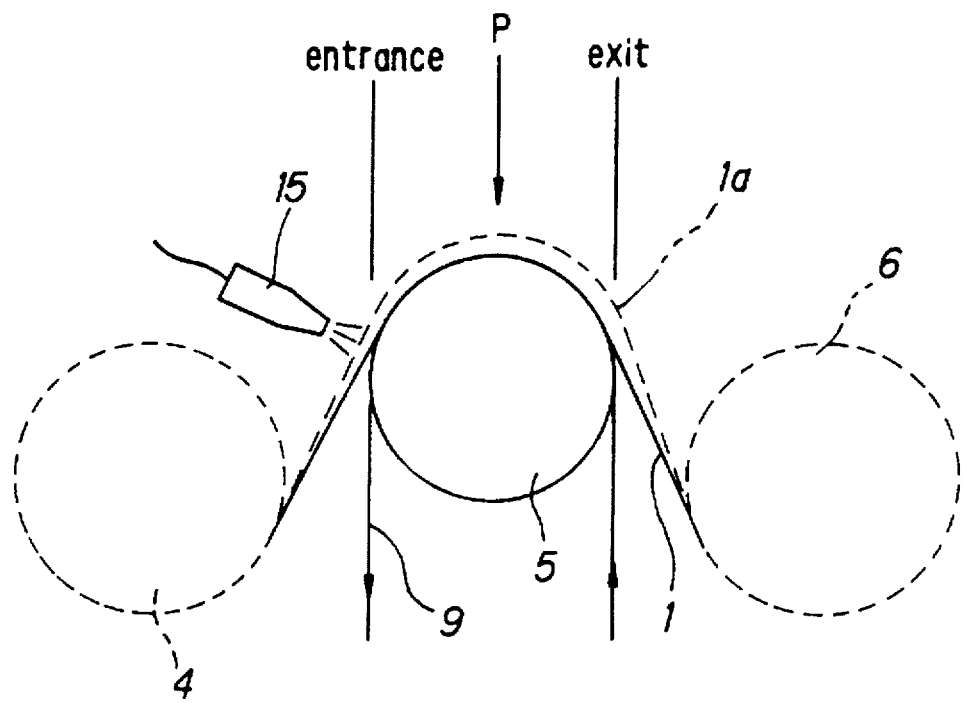
FIG. 6 is a partial enlarged view of FIG. 5.

The air nozzle 15 as shown enlarged in FIG. 6, is disposed on an initial position side where the magnetic tape 1 and the lapping tape 9 are intended to make contact. Here, the initial position side refers to from the central part (the point P in FIG. 6) to the front side (the position of the air nozzle 15 in FIG. 6) of the range of the circular arc over which it is intended that the magnetic tape 1 and the lapping tape 9 make contact. That is, the air nozzle 15 can be disposed on the outer side of the tapes in any position between the entrance (the guide roller 4 side) of the guide roller 5 for lapping to the exit (the guide roller 6 side) thereof, and in that range the position of the air nozzle 15 in FIG. 6 is preferable. The air nozzle 15 thus disposed has the function of blowing pressurized air onto the magnetic tape 1 from the outer side thereof and thereby pushing the magnetic tape 1 onto the lapping tape 9, cutting off the air film (illustrated by the magnetic tape 1a in FIG. 6) between the two, thereby increasing the quality of the contact and the friction between the two and as a result increasing the effect of the magnetic tape surface treatment.

There are provided as many air nozzles 15 as there are strips of magnetic tape 1 cut by the slitter.

The air pressure regulating valve 16, as shown in FIG. 5, has the function of regulating the pressure of the pressurized air blown out from the air nozzle 15 based on a control signal from the control circuit 17.

The control circuit 17, as shown in FIG. 5, is made up of a speed setter 18 for setting the speed of the motor 3, an entrance tension setter 19 for setting an entrance tension, an exit tension setter 20 for setting an exit tension, a lapping feed speed setter 21 for setting the feed speed of the lapping tape 9, a speed correcting circuit 22, a pressure setter 23 for setting the pressure of the air, a subtracter 24, a multiplier 25, an adder 26, a subtracter 27, an adder 28, PIDs 29, 30, 31, INVs 32, 33 and an SPC 34.

A speed signal A showing a speed set by the speed setter 18 is fed to the motor 3 through the PID 29 and the INV 32 and controls the rotational speed of the motor 3. This speed signal A is also one of the inputs of the adder 28 and an input of the speed correcting circuit 22.

The difference between an entrance tension set value set by the entrance tension setter 19 and an entrance tension detected value from the entrance tension detector 13 is obtained by the subtracter 24. The difference signal obtained becomes an input of the adder 26 by way of the PID 29.

The difference between an exit tension set value set by the exit tension setter 20 and an exit tension detected value from the exit tension detector 14 is obtained by the subtracter 27 and the difference signal obtained is the other input of the adder 28.

A set value set by the lapping feed speed setter 21 is fed to the motor 12 through the SPC 34, and this determines the travel speed of the lapping tape 9.

The speed correcting circuit 22 incorporates a table 22a showing correction values of the air blowout pressure of the air nozzle 15 corresponding to the rotational speed of the infeed rollers 2. That is, based on the value of the speed signal A from the speed setter 18 the speed correcting circuit 22 refers to the table 22a and searches for a corresponding correction value and sends this to the multiplier 25.

The multiplier 25 multiplies together an air pressure value set by the pressure setter 23 and the correction value from the speed correcting circuit 22 and thereby calculates an air pressure corresponding to the set speed of the infeed rollers 2 and sends it to the adder 26.

The adder 26 adds the output from the PID 29, i.e. the difference between the set value and the detected value of the entrance tension, to the corrected pressure value from the multiplier 25 and sends the addition result to the air pressure regulating valve 16 as a control signal. The air pressure regulating valve 16 regulates the air blowout pressure of the air nozzle 15 according to this control signal.

The adder 28 adds together the speed signal A and the output of the subtracter 27, feeds this addition result through the PID 30 and the INV 33 to the motor 8 and controls the rotation of the outfeed rollers 7.

The overall operation of the preferred embodiment is as follows:

(1) Surface Treatment Efficiency

By pressurized air being blown onto the magnetic tape 1, the surface treatment efficiency increases to a level several times past levels. Because as described above the magnetic tape 1 is pushed onto the lapping tape 9 by the pressurized air blown out from the air nozzle 15 and the two tapes make good contact, it becomes difficult for an air film to enter between the two and floating up of the magnetic tape 1 from the lapping tape 9 is suppressed.

As a result, over the whole contact surface of the magnetic tape 1 and the lapping tape 9, the contact quality between the two becomes good and therefore the friction becomes strong and as a result the number of projections and the amount of adhered matter on the magnetic surface of the magnetic tape 1 removed by the friction of one pass of the magnetic tape over the lapping tape becomes several times that in the case of a conventional magnetic tape surface treatment apparatus wherein no air is blown. In other words, the treatment efficiency rises by several times.

(2) Simultaneous Control of Entrance Tension and Exit Tension

The entrance tension is changed by controlling the pressure of the air blown out from the air nozzle 15, and the exit tension is changed by controlling the rotation of the outfeed rollers 7. Therefore, by feedback controlling the air blowout pressure and the rotation of the outfeed rollers 7 by means of the control circuit 17 with the speed of the infeed rollers 2, i.e. the treatment speed, as a reference, both the entrance tension and the exit tension are simultaneously controlled and constantly optimized. This is described in detail below.

Figure 7:
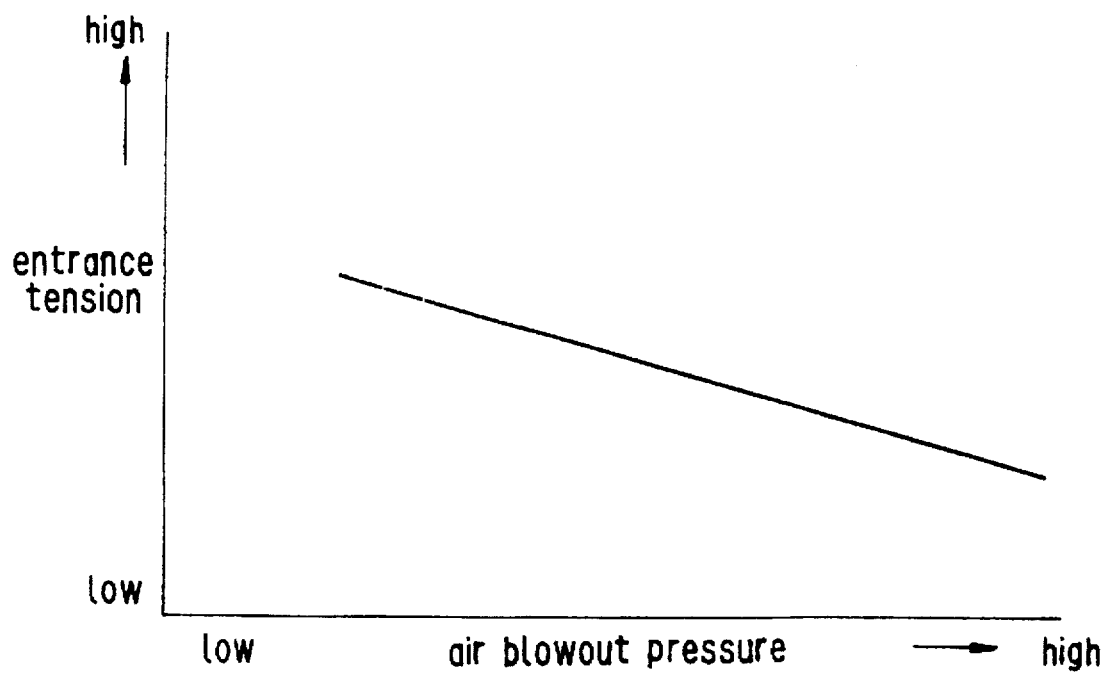
FIG. 7 is a graph showing a relationship between air blowout pressure and entrance tension.

Because the pressurized air blown out from the air nozzle 15 works as a forward brake on the magnetic tape 1 fed out from the infeed rollers 2 at a constant speed, as shown in FIG. 7, if the air blowout pressure becomes high the entrance tension falls and the if the air blowout pressure becomes low the entrance tension increases.

Figure 8:
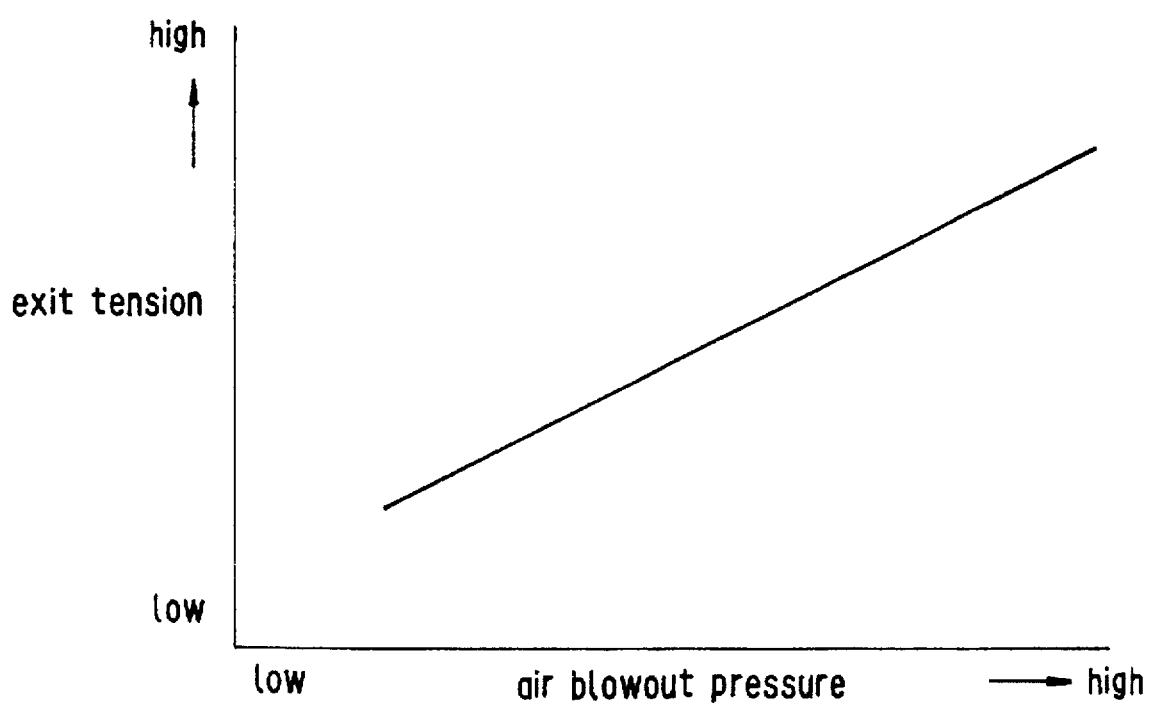
FIG. 8 is a graph showing a relationship between air blowout pressure and exit tension.

Also, because the pressurized air works as a rearward brake on the magnetic tape 1 pulled by the outfeed rollers 7, as shown in FIG. 8, if the air blowout pressure becomes high the exit tension increases and if the air blowout pressure becomes low the exit tension falls.

The infeed rollers 2 are rotated by the fixed speed signal A set by the speed setter 18. The entrance tension to be maintained by this speed signal A and the air pressure are respectively set by the entrance tension setter 19 and the pressure setter 23.

When the speed signal A of the infeed rollers 2 is changed, an air pressure value corresponding to the changed speed signal A is outputted from the multiplier 25. That is, control is constantly performed with the speed signal A of the infeed rollers 2 as a reference.

Supposing that for some reason the entrance tension has increased, the output value of the subtracter 24 falls and consequently the output value of the adder 26 falls. As a result, the air pressure regulating valve 16 increases the air blowout pressure of the air nozzle 15 and reduces the entrance tension. That is, the entrance tension is feedback controlled by way of the pressurized air and is kept constant at all times.

At this time, because the exit tension rises due to the rise in the air blowout pressure, the output value of the subtracter 27 falls and consequently the output value of the adder 28 falls. As a result, the outfeed rollers 7 are controlled so that they keep the exit tension constant.

Also, when for some reason the entrance tension has fallen the various parts operate oppositely to that described above and the entrance tension and the exit tension are respectively stably held.

Also, when for some reason the exit tension has changed from the set value, the output value of the subtracter 27 changes and consequently the output value of the adder 28 changes and as a result the rotation of the outfeed rollers 7 is controlled and they work to keep the exit tension constant. That is, the exit tension is feedback controlled by way of the exit speed.

As described above, in this preferred embodiment, because the entrance tension and the exit tension are simultaneously feedback controlled, dispersion in the surface treatment effect on the magnetic tape 1 is eliminated.

Figure 9:
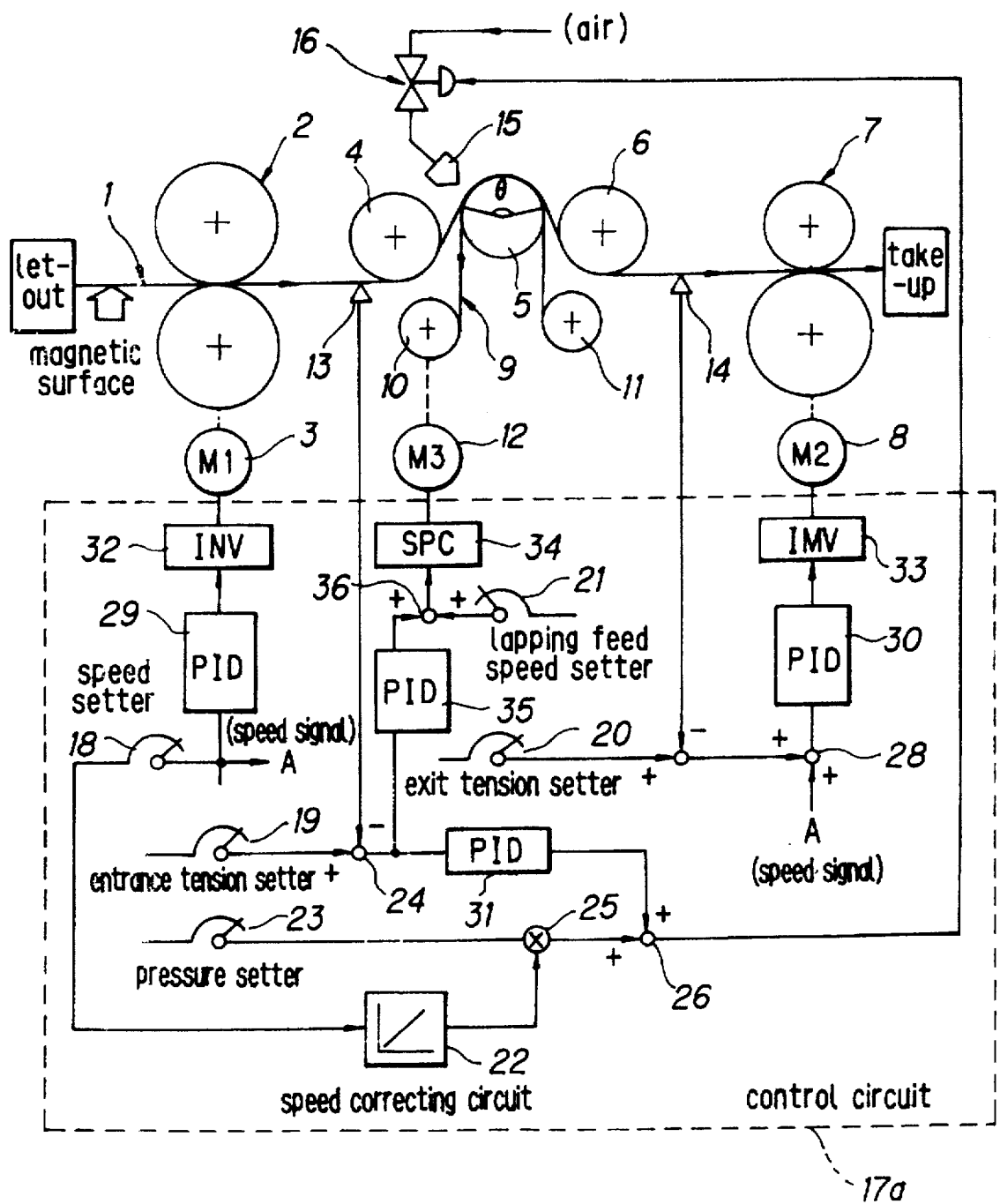
FIG. 9 is a block diagram showing the construction of a second preferred embodiment of a magnetic tape surface treatment apparatus according to the invention.

Next, a second preferred embodiment of a magnetic tape surface treatment apparatus according to the invention will be described with reference to FIG. 9. In FIG. 9, reference numerals the same as FIG. 5 indicate the same things and a description thereof will be omitted.

A control circuit 17a of this preferred embodiment consists of the control circuit 17 of the first preferred embodiment with a lapping tape feed speed control circuit added.

This lapping tape feed speed control circuit is made up of a subtracter 24 which obtains the difference between a set value and a detected value of the entrance tension, a PID 35 which converts the output value of the subtracter 24 into a speed, a lapping feed speed setter 21 and an adder 36 which adds the output of the PID 35 to the output of the lapping feed speed setter 21 and outputs that addition result to an SPC 34.

This lapping tape feed speed control circuit has the following purpose and operation: Generally, when surface treatment is carried out on a magnetic tape 1 on the magnetic surface of which there are is a lot of dropout, clogging of the lapping tape 9 occurs and the friction between the lapping tape 9 and the magnetic tape 1 falls. The lapping tape feed speed control circuit is for promoting stability of the surface treatment effect by keeping the friction constant even in this kind of case.

Because when the friction changes the entrance tension changes and as a result the output of the subtracter 24 changes, the travel speed of the lapping tape 9 is changed by correcting the set speed set by the lapping feed speed setter 21 with the output change of the subtracter 24.

Figure 10:
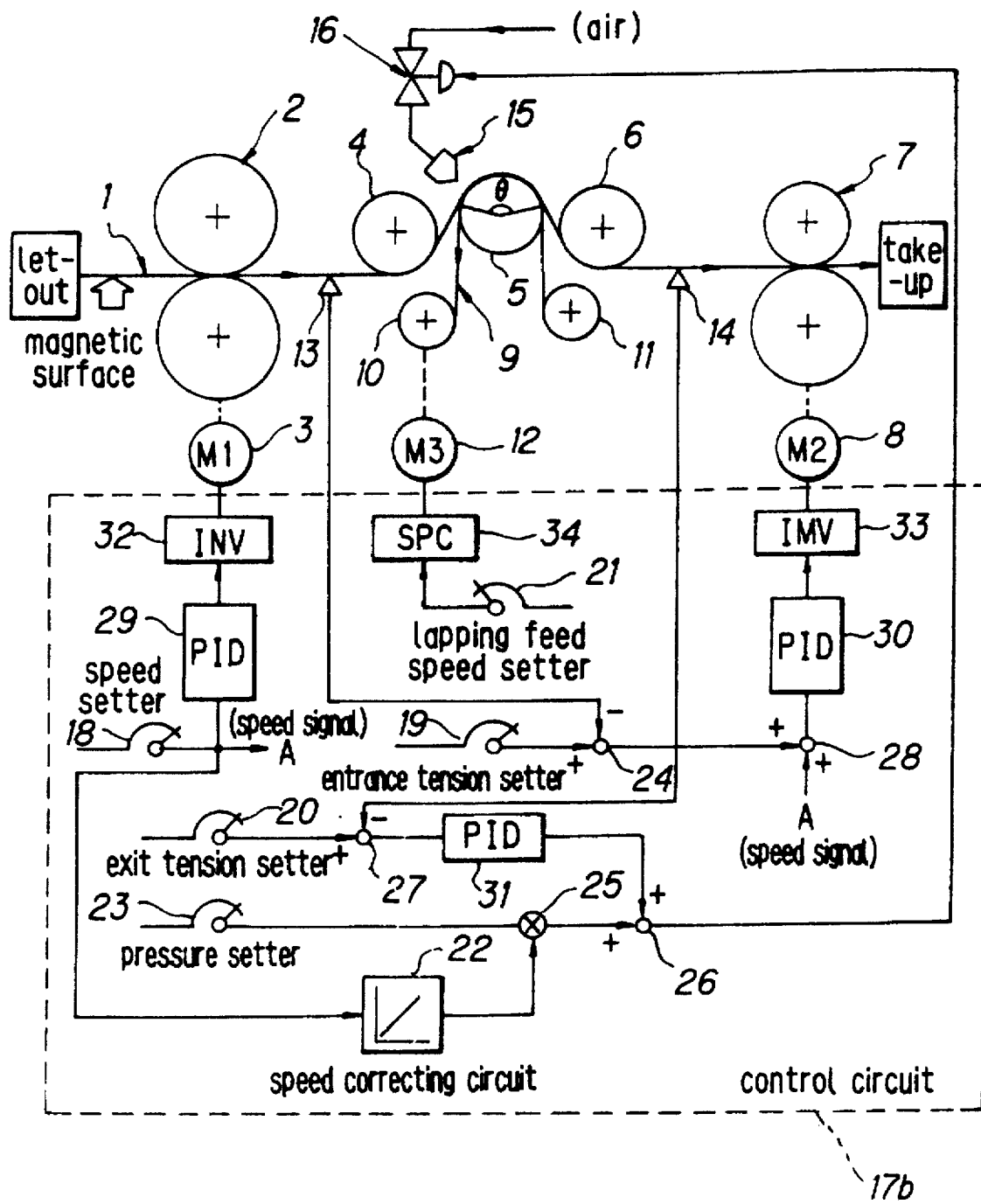
FIG. 10 is a block diagram showing the construction of a third preferred embodiment of a magnetic tape surface treatment apparatus according to the invention.

Next, a third preferred embodiment of a magnetic tape surface treatment apparatus according to the invention will be described with reference to FIG. 10. In FIG. 10, reference numerals the same as in FIG. 5 indicate the same parts.

In this preferred embodiment, the output of the subtracter 24 of a control circuit 17b (the difference between a set value and a detected value of the entrance tension) is an input of the adder 28, and the output of the subtracter 27 (the difference between a set value and a detected value of the exit tension) is an input of the adder 26.

That is, in the reverse of the first preferred embodiment, the entrance tension is feedback controlled by way of the rotational speed of the outfeed rollers 7 and the exit tension is feedback controlled by way of the air blowout pressure from the air nozzle 15.

Figure 11:
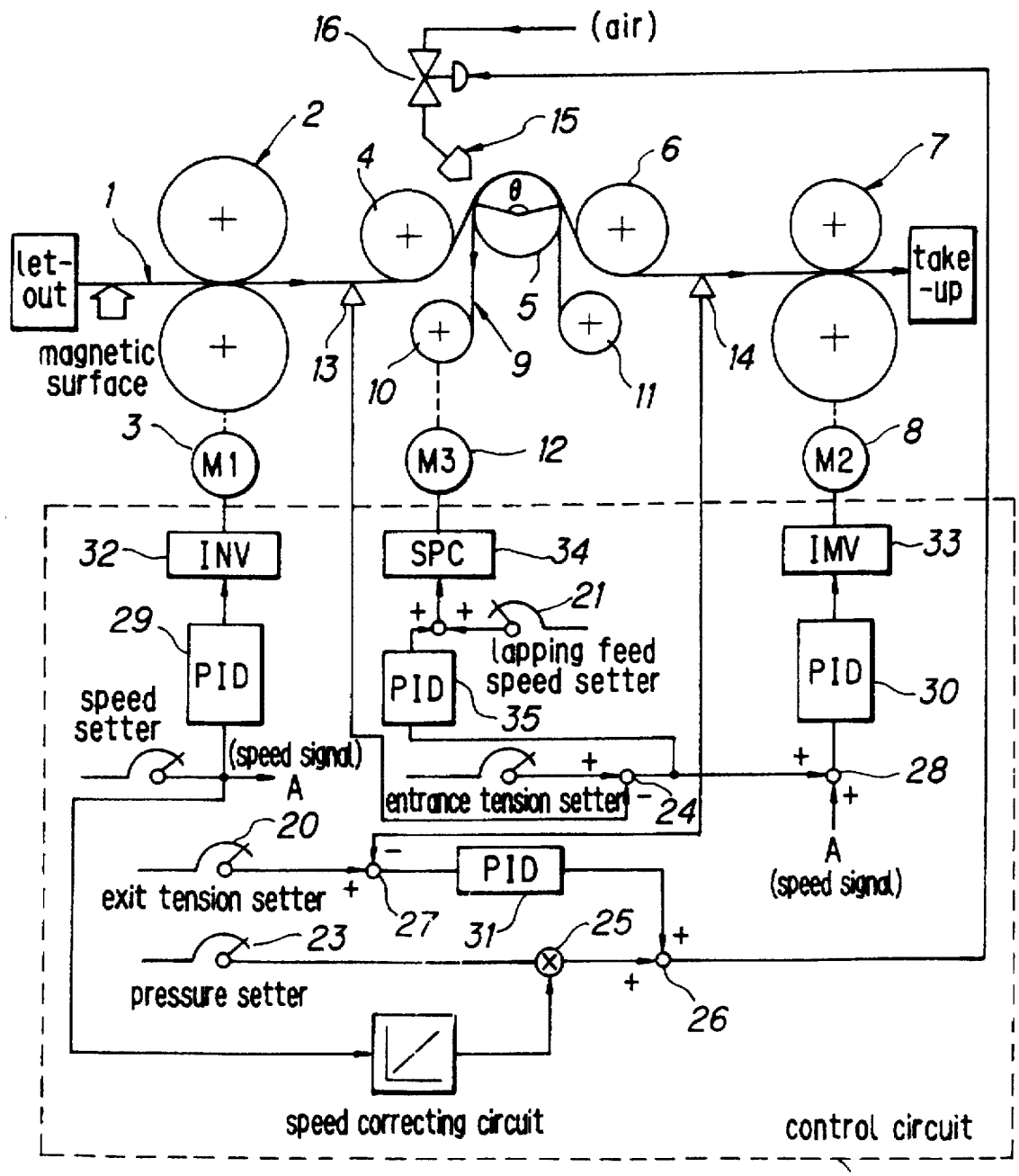
FIG. 11 is a block diagram showing the construction of a fourth preferred embodiment of a magnetic tape surface treatment apparatus according to the invention.

Next, a fourth preferred embodiment of a magnetic tape surface treatment apparatus according to the invention will be described with reference to FIG. 11. In FIG. 11, reference numerals the same as in FIG. 10 indicate the same parts.

This preferred embodiment consists of the same lapping tape feed speed control circuit as that of the second preferred embodiment added to the third preferred embodiment, and the operation of this lapping tape feed speed control circuit is the same as described above.

In all the preferred embodiments described above, the rotational speed of the infeed rollers 2 is kept constant and the rotation of the outfeed rollers 7 is controlled with this as a reference; however, it is of course also possible in the reverse of this for the rotation of the infeed rollers 2 to be controlled with the rotation of the outfeed rollers 7 as a reference.

The several preferred embodiments described above illustrate the principle of simultaneously controlling the tension of the magnetic tape on an entrance side on which a magnetic tape 1 is let out and the tension of the magnetic tape on the exit side on which the magnetic tape 1 is taken up. Accordingly, the invention is not limited to these, and for example the constructions shown below can alternatively be adopted.

[1] The speed of the magnetic tape on the entrance side on which the magnetic tape 1 is let out is kept constant and made a reference and the speed of the magnetic tape on the exit side on which the magnetic tape 1 is taken up is controlled and the tension of the magnetic tape on the exit side on which the magnetic tape 1 is taken up is thereby feedback controlled and the force of air blown out from pressurized air means is controlled and the entrance side tension is thereby feedback controlled.

[2] The speed of the magnetic tape on the entrance side on which the magnetic tape 1 is let out is kept constant and made a reference and the speed of the magnetic tape on the exit side on which the magnetic tape 1 is taken up is controlled and the tension of the magnetic tape on the exit side on which the magnetic tape 1 is taken up is thereby feedback controlled and air from the pressurized air means is controlled and the tension of the magnetic tape on the exit side is thereby feedback controlled.

[3] The speed of the magnetic tape on the entrance side on which the magnetic tape 1 is let out is kept constant and made a reference and the speed of the magnetic tape on the exit side on which the magnetic tape 1 is taken up is controlled and the tension of the magnetic tape on the exit side on which the magnetic tape 1 is taken up is thereby feedback controlled and air from the pressurized air means is controlled and the tension of the magnetic tape on the entrance side on which the magnetic tape 1 is let out is thereby feedback controlled.

[4] The speed of the magnetic tape on the exit side on which the magnetic tape 1 is taken up is kept constant and made a reference and the speed of the magnetic tape on the entrance side on which the magnetic tape 1 is let out is controlled and the tension of the magnetic tape on the exit side is thereby feedback controlled and air blown out from the pressurized air means is controlled and the entrance side tension is thereby feedback controlled.

[5] Based on the tension of the magnetic tape on the entrance side on which a magnetic tape 1 is let out or the tension of the magnetic tape on the exit side on which the magnetic tape 1 is taken up the speed of a lapping tape 9 and/or the force of air from the pressurized air means are controlled and the tension of the magnetic tape on the entrance side and the tension of the magnetic tape on the exit side are thereby feedback controlled.

[6] Based on the tension of the magnetic tape on the entrance side on which the magnetic tape 1 is let out the speed of the magnetic tape on the exit side on which the magnetic tape 1 is taken up is controlled and based on the tension of the magnetic tape on the exit side on which the magnetic tape 1 is let out the speed of the magnetic tape on the entrance side is controlled and the tension of the magnetic tape on the entrance side and the tension of the magnetic tape on the exit side are thereby feedback controlled.

[7] With the force of air blown out of the pressurized air means made a reference the speed of the magnetic tape on the entrance side on which the magnetic tape 1 is let out is controlled and the tension of the magnetic tape on the exit side on which the magnetic tape 1 is taken up is thereby feedback controlled and the speed of the magnetic tape on the exit side on which the magnetic tape 1 is taken up is controlled and the tension of the magnetic tape on the exit side is thereby feedback controlled.

[8] With the force of air blown out of the pressurized air means made a reference the speed of the magnetic tape on the exit side on which the magnetic tape 1 is taken up is controlled and the tension of the magnetic tape on the exit side is thereby feedback controlled and the speed of the magnetic tape on the entrance side on which the magnetic tape 1 is let out is controlled and the tension of the magnetic tape on the entrance side is thereby feedback controlled.

[9] With the force of air blown out of pressurized air means made a reference the speed of the lapping tape 9 is controlled and the tension of the magnetic tape on the entrance side on which the magnetic tape 1 is let out and the tension of the magnetic tape on the exit side on which the magnetic tape 1 is taken up are thereby feedback controlled.

[10] With the speed of a lapping tape 9 as a reference the speed of the magnetic tape on the entrance side on which the magnetic tape 1 is let out is controlled and the tension of the magnetic tape on the entrance side on which the magnetic tape 1 is let out is thereby feedback controlled and the speed of the magnetic tape on the exit side on which the magnetic tape 1 is taken up is controlled and the tension of the magnetic tape on the exit side is thereby feedback controlled.

[11] With the speed of the lapping tape 9 as a reference the speed of the magnetic tape on the exit side on which the magnetic tape 1 is taken up is controlled and the tension of the magnetic tape on the exit side is thereby feedback controlled and the speed of the magnetic tape on the entrance side on which the magnetic tape 1 is let out is controlled and the tension of the magnetic tape on the entrance side is thereby feedback controlled. [12] With the speed of the lapping tape 9 as a reference the tension of the magnetic tape on the entrance side on which a magnetic tape 1 is let out and the tension of the magnetic tape on the exit side on which the magnetic tape 1 is taken up are feedback controlled.

Also, a magnetic tape surface treatment apparatus according to the invention described above based on several preferred embodiments can be applied to a magnetic tape slitter. When it is applied to a magnetic tape slitter, because there are no tension fluctuations, variations in the width of the magnetic tape are eliminated and the product quality of the tape can be further improved.

As described above, in a magnetic tape surface treatment method and apparatus thereof according to the invention, by blowing air onto a magnetic tape and a lapping tape where they are intended to make contact with each other it is possible to greatly improve the surface treatment effect by eliminating an air film occurring where the magnetic tape and the lapping tape are to rub and thereby raising the contact quality and as a result the valuable benefit is achieved that it is possible to greatly raise magnetic tape productivity.

Also, by simultaneously controlling the tension of the magnetic tape on the entrance side on which the magnetic tape 1 is let out and the tension of the magnetic tape on the exit side on which the magnetic tape 1 is taken up it is possible to continuously keep the tension of the magnetic tape on the entrance side and the tension of the magnetic tape on the exit side at optimum values and the valuable effect is achieved that it is possible to reduce dropouts of the magnetic tape.

What is claimed is:

1. A magnetic tape surface treatment method for transporting a magnetic tape and a lapping tape relative to each other while causing them to make contact thereby to remove projections and adhered matter from a magnetic surface of the magnetic tape, said method comprising the steps of:

blowing air onto the magnetic tape at a position where the magnetic tape and the lapping tape make contact to inhibit formation of an air gap between the tapes; and regulating with respect to each other a force of the blowing air, a tension of the magnetic tape on an entrance side on which it is let out, and a tension of the magnetic tape on an exit side on which it is taken up.

2. The magnetic tape surface treatment method according to claim 1 comprising the further step of changing a travel speed of the lapping tape in correspondence with a travel speed of the magnetic tape.

3. The magnetic tape surface treatment method according to claim 1 comprising the step of carrying out the air blowing at a position where the magnetic tape initially contacts the lapping tape.

4. A magnetic tape surface treatment apparatus for rubbing a magnetic tape with a lapping tape and removing projections and adhered matter from a magnetic surface of the magnetic tape, said apparatus comprising:

regulating means for regulating a tension of the magnetic tape; and pressurized air means for blowing air onto the tapes at a position where the magnetic tape and the lapping tape make contact to inhibit formation of an air gap between the tapes;

said regulating means comprising controlling means for simultaneously feedback controlling a tension of the magnetic tape on an entrance side on which the magnetic tape is let out and a tension of the magnetic tape on an exit side on which the magnetic tape is taken up.

5. The magnetic tape surface treatment apparatus according to claim 4, wherein the controlling means takes as a reference a speed of the magnetic tape on the entrance side on which the magnetic tape is let out and controls a speed of the magnetic tape on the exit side on which the magnetic tape is taken up to control via feedback the tension of the magnetic tape on the exit side and controls a force of the pressurized air generated by the pressurized air means to control via feedback the tension of the magnetic tape on the entrance side, said pressurized air acting as a forward brake to increase the tension of the magnetic tape on the entrance side as the force of the pressurized air decreases and to decrease the tension of the magnetic tape on the entrance side as the force of the pressurized air increases.

6. The magnetic tape surface treatment apparatus according to claim 5 comprising the step of keeping the speed of the magnetic tape on the entrance side on which the magnetic tape is let out constant.

7. The magnetic tape surface treatment apparatus according to claim 4, wherein the controlling means takes as a reference a speed of the magnetic tape on the entrance side on which the magnetic tape is let out and controls a speed of the magnetic tape on the exit side on which the magnetic tape is taken up to control via feedback the tension of the magnetic tape on the entrance side and controls a force of the pressurized air generated by the pressurized air means to control via feedback the tension of the magnetic tape on the exit side, said pressurized air acting as a rearward brake to decrease the tension of the magnetic tape on the exit side as the force of the pressurized air decreases and to increase the tension of the magnetic tape on the exit side as the force of the pressurized air increases.

8. The magnetic tape surface treatment apparatus according to claim 4, wherein the controlling means takes as a reference a speed of the magnetic tape on the exit side on which the magnetic tape is taken up and controls a speed of the magnetic tape on the entrance side on which the magnetic tape is let out to control via feedback the tension of the magnetic tape on the entrance side and controls a force of the pressurized air generated by the pressurized air means to control via feedback the tension of the magnetic tape on the exit side.

9. The magnetic tape surface treatment apparatus according to claim 4, wherein the controlling means takes as a reference a speed of the magnetic tape on the exit side on which the magnetic tape is taken up and controls a speed of the magnetic tape on the entrance side on which the magnetic tape is let out to control via feedback the tension of the magnetic tape on the exit side and controls a force of the pressurized air generated by the pressurized air means to control via feedback the tension of the magnetic tape on the entrance side.

10. The magnetic tape surface treatment apparatus according to claim 8 comprising the step of keeping the speed of the magnetic tape on the exit side on which the magnetic tape is taken up constant.

11. The magnetic tape surface treatment apparatus according to claim 4, wherein the controlling means takes as a reference at least one of the tension of the magnetic tape on the entrance side on which the magnetic tape is let out and the tension of the magnetic tape on the exit side on which the magnetic tape is taken up and controls at least one of a speed of the lapping tape and a force of the air of the pressurized air means to control via feedback the tension of the magnetic tape on the entrance side and the tension of the magnetic tape on the exit side.

12. The magnetic tape surface treatment apparatus according to claim 4, wherein the controlling means controls a speed of the magnetic tape on the exit side on which the magnetic tape is taken up based on the tension of the magnetic tape on the entrance side on which the magnetic take is let out and controls a speed of the magnetic tape on the entrance side based on the tension of the magnetic tape on the exit side to control via feedback the tension of the magnetic tape on the entrance side and on the exit side.

13. The magnetic tape surface treatment apparatus according to claim 4, wherein the controlling means takes as a reference a force of the air of the pressurized air means and controls a speed of the magnetic tape on the entrance side on which the magnetic tape is let out to control via feedback the tension of the magnetic tape on the entrance side.

14. The magnetic tape surface treatment apparatus according to claim 4, wherein the controlling means takes as a reference a force of the air of the pressurized air means and controls a speed of the magnetic tape on the exit side on which the magnetic tape is taken up to control via feedback the tension of the magnetic tape on the exit side.

15. The magnetic tape surface treatment apparatus according to claim 4, wherein the controlling means takes as a reference a force of the air of the pressurized air means and controls a speed of the lapping tape to control via feedback the tension of the magnetic tape on the entrance side on which the magnetic tape is let out and on the exit side on which the magnetic tape is taken up.

16. The magnetic tape surface treatment apparatus according to claim 4, wherein the controlling means takes as a reference a speed of the lapping tape and controls a speed of the magnetic tape on the entrance side on which the magnetic tape is let out to control via feedback the tension of the magnetic tape on the entrance side and controls a speed of the magnetic tape on the exit side on which the magnetic tape is taken up to control via feedback the tension of the magnetic tape on the exit side.

17. The magnetic tape surface treatment apparatus according to claim 4, wherein the controlling means takes as a reference a speed of the lapping tape and controls a speed of the magnetic tape on the exit side on which the magnetic tape is taken up to control via feedback the tension of the magnetic tape on the exit side and controls a speed of the magnetic tape on the entrance side on which the magnetic tape is let out to control via feedback the tension of the magnetic tape on the entrance side.

18. The magnetic tape surface treatment apparatus according to claim 4, wherein the controlling means takes as a reference a speed of the lapping tape and controls via feedback the tension of the magnetic tape on the entrance side on which the magnetic tape is let out and the tension of the magnetic tape on the exit side on which the magnetic tape is taken up.

* * * * *